United States Patent
Zhang et al.

(10) Patent No.: US 9,351,240 B2
(45) Date of Patent: May 24, 2016

(54) REAL-TIME COMMUNICATION SYSTEM, DEVICE, AND METHOD

(71) Applicant: NATIONZ TECHNOLOGIES INC., Shenzhen, Guangdong (CN)

(72) Inventors: Jianguo Zhang, Shenzhen (CN); Shan Zhu, Shenzhen (CN)

(73) Assignee: NATIONZ TECHNOLOGIES INC., Shenzhen, Guangdong (CN)

( * ) Notice: Subject to any disclaimer, the term of this patent is extended or adjusted under 35 U.S.C. 154(b) by 206 days.

(21) Appl. No.: 13/915,459

(22) Filed: Jun. 11, 2013

(65) Prior Publication Data

US 2013/0273960 A1    Oct. 17, 2013

Related U.S. Application Data

(63) Continuation of application No. PCT/CN2011/084147, filed on Dec. 16, 2011.

(30) Foreign Application Priority Data

Dec. 22, 2010   (CN) .......................... 2010 1 0600682

(51) Int. Cl.
| | |
|---|---|
| H04W 48/00 | (2009.01) |
| H04W 48/20 | (2009.01) |
| H04L 12/58 | (2006.01) |
| H04L 29/06 | (2006.01) |
| H04W 48/04 | (2009.01) |

(52) U.S. Cl.
CPC ............. *H04W 48/20* (2013.01); *H04L 12/581* (2013.01); *H04L 51/04* (2013.01); *H04L 63/0492* (2013.01); *H04L 63/08* (2013.01); *H04W 48/04* (2013.01); *H04L 12/5865* (2013.01); *H04L 12/5895* (2013.01)

(58) Field of Classification Search
CPC .............................. H04L 12/581; H04W 48/04
USPC ......... 455/517, 515, 434, 67.11, 456.1, 456.3
See application file for complete search history.

(56) References Cited

U.S. PATENT DOCUMENTS

| | | | |
|---|---|---|---|
| 2011/0088080 A1* | 4/2011 | Stupar et al. ...................... 726/4 |
| 2011/0294539 A1* | 12/2011 | Shin et al. .................. 455/552.1 |
| 2012/0069131 A1* | 3/2012 | Abelow ..................... 348/14.01 |
| 2012/0258740 A1* | 10/2012 | Mildh et al. ............... 455/456.4 |

\* cited by examiner

*Primary Examiner* — John J Lee
(74) *Attorney, Agent, or Firm* — Young Basile Hanlon & MacFarlane P.C.

(57) ABSTRACT

Systems, devices, and methods allow real-time communication between an access device and at least one communication device. The access device is configured to: determine whether a distance between a communication device and the access device reaches a predetermined access distance for accessing a network; if so, allow the communication device to gain access to the network via the access device to achieve real-time communication between the communication device and the network.

20 Claims, 5 Drawing Sheets

REAL-TIME COMMUNICATION SYSTEM, DEVICE, AND METHOD

CROSS-REFERENCE TO RELATED APPLICATIONS

The present application is a continuation of PCT/CN2011/084147, filed on Dec. 16, 2011, which claims priority to CN 201010600682.1, filed on Dec. 22, 2010. The disclosures of these applications are hereby incorporated by reference in their entirety.

BACKGROUND

As communication technologies continue to progress, methods of communications become more diverse. Whether for work or for daily life, users are not bound to having real-time communications while in the offices or at homes.

SUMMARY

The present disclosure relates to communications, and more specifically to a real-time communication system, access devices, communication devices, and methods through which the communication devices access a network.

In an aspect, a real-time communication system is provided including: an access device; wherein the access device is configured to: determine whether a distance between a communication device and the access device reaches a predetermined access distance for accessing a network; if so, allow the communication device to gain access to the network via the access device to achieve real-time communication between the communication device and the network.

In some embodiments, the access device includes: a distance control module; a first wireless communication module; and a first control module configured to coordinate and control the distance control module and the first wireless communication module; wherein the communication device comprises: a distance response module; a second wireless communication module; and a second control module configured to coordinate and control the distance response module and the second wireless communication module; wherein the distance control module and the distance response module are coupled through a distance characteristic signal configured to control the predetermined access distance between the communication device and the access device when the communication device access the network; wherein the first wireless communication module and the second wireless communication module are connected via a network signal configured to enable the communications device to access the network via said access device; wherein if the access device determines that the distance between the communication device and the access device reaches the predetermined access distance for accessing the network, the first wireless communication module and the second wireless communication module establish a connection, which enables the communications device to access the network through the access device, thereby realizing real-time communication between the communication device and other communication devices in the network.

In some embodiments, the access device includes: a distance control module; and a control module; wherein the distance control module is configured to: send a distance characteristic signal within the predetermined access distance; and receive a response message sent back by the communication device; wherein the control module is configured to: determine whether the distance between the communication device and said access device reaches the predetermined access distance; determine that the predetermined access distance is reached if the distance control module receives the response message, and allow the communication device to access the network and save the response message in the control module; and issue network access parameters to the distance response module through the distance control module.

In some embodiments, the system further includes at least one communication device, wherein the communication device comprises: a distance response module; and a wireless communication module; wherein the distance response module is configured to: receive a characteristic signal issued by the access device within the predetermined access distance; return a response message; and receive network access parameter issued by the access device after the access device determines that the response message is legitimate; and wherein the wireless communication module is configured to access the network according to the network parameters through the access device.

In some embodiments, the distance characteristic signal includes at least one of an acoustic signal, an optical signal, or an electromagnetic signal.

In some embodiments, the access device is configured to allow the communication device to gain access to the network based on substantially precise range control without password authentication.

In another aspect, a communication method between a real-time communication system and a plurality of communication devices is provided, wherein the real-time communication system includes an access device, the method including: determining whether a distance between a communication device and the access device reaches a predetermined access distance for accessing a network; if so, allowing the communication device to gain access to the network via the access device to achieve real-time communication between the communication device and the network.

In some embodiments, the access device includes: a distance control module; a first wireless communication module; and a first control module; wherein the communication device includes: a distance response module; a second wireless communication module; and a second control module; wherein the method further comprises: issuing, from the distance control module, characteristics signals in the form of broadcasting within the predetermined access distance; receiving, at the distance response module, the distance characteristic signals; and sending, from the distance response module, a first response message to the distance control module; receiving, at the distance control module, the first response message; determining, at the access device, that the distance between the communication device and the access device has reached the predetermined access distance; saving the first response message in the first control module; issuing, from the first control module, network access parameters to the distance response module through the distance control module; sending, from the response module, the network access parameters to the first wireless communication module through the second control module and the second wireless communication module in turn; establishing, at the first wireless communication module, network signal connection between the first wireless communication module and the second wireless communication module according to the network access parameters received.

In some embodiments, the method further includes: during the process in which the distance response module receives the distance characteristic signal and returns the first response message to said distance control module, before the response message is returned, determining whether the distance response module receives the distance characteristic signal; if yes, returning the response message; if no, continuing to wait.

In some embodiments, the method further includes: prior to issuing the network access parameters, determining, at the first control module, whether the first response message is legitimate; if yes, issuing the network access parameters to the distance response module; if no, going back to the step in which the distance control module issues the distance characteristic signals in the form of broadcasting within the predetermined access distance.

In some embodiments, said issuing characteristics signals includes at least one of; active querying; or sending the characteristics signals after the distance control module being triggered.

In some embodiments, said issuing characteristics signals includes: sending, from the distance response module, the distance characteristic signals after the distance response module sending an access request signal to the distance control module thereby triggering the distance control module.

In some embodiments, the method further includes: after the distance control module receiving the access request signal., sending the distance characteristic signals in the form of broadcasting.

In some embodiments, the method further includes: during the process of conducting real-time communication, detecting, at the distance control module, the distance between the communication device and the access device; issuing, from the distance control module, command message periodically to request the communication device to return a second response message; receiving, at the first control module, the second response message through the distance control module; comparing the second response message with the first response message stored in the first control module; if the first and second response messages are consistent, then maintaining network connection with the communication device; and if the first and second response messages are not consistent, then disconnecting the communication device from the network.

In some embodiments, said determining comprises precisely determining the distance such that the communication device is allowed to access the network based on the precisely determined distance without the need for password authentication.

In some embodiments, the method further includes: automatically connecting the communication device to the network without password authentication once the communication device is within the predetermined distance based on the precisely determined distance.

In some embodiments, the method further includes: automatically disconnecting the communication device from the network once the communication device is beyond the predetermined distance based on the precisely determined distance.

DETAILED DESCRIPTION

Figure 1:
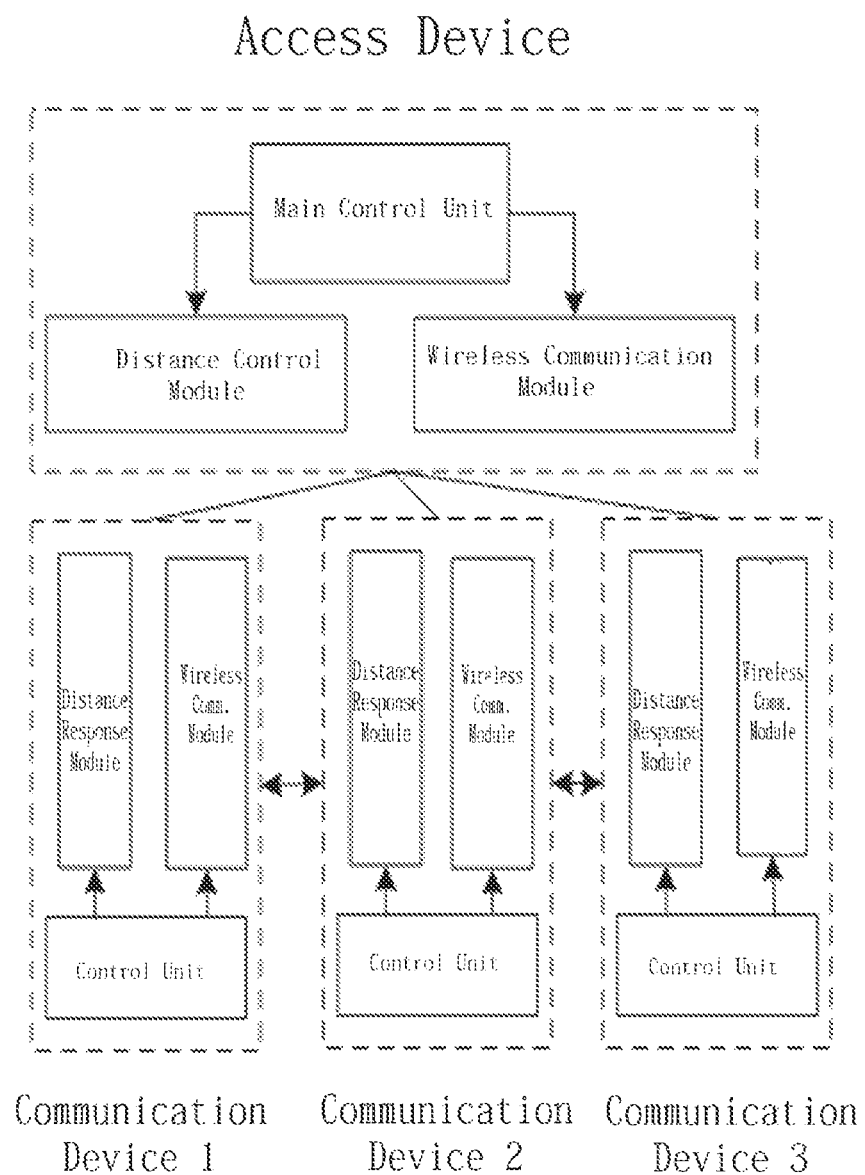
FIG. 1 is a diagram a communication system architecture according to some embodiments.

The disclosure provides a real-time communication tool through which users can achieve various goals. For example, when users step into a site, they will be able to automatically access the network of this site and conduct real-time communication therein. When the users are out of this site, they will be automatically disconnected from the network. This brings significant convenience to the users.

At some locations, such as some colleges, universities and businesses, as long as some communication devices are within the wireless network coverage area, these communication devices can access the wireless network to conduct real-time communication. Some of the embodiments disclosed herein provide a precise control of the wireless network coverage area. For example, the range of a conventional WiFi network coverage may be between a few decameters and a few hundred meters, and it is difficult to control this range. As a result of lacking accurate range control, a password is usually setup for accessing the wireless network. That is, to prevent user terminals outside the premises to access the network, user terminals within the premises would have to use password authentication when they use the network.

Various embodiments disclosed herein provide a real-time communication system through which users can conveniently access the network and conduct real-time communication within a specific area with a substantially precisely controlled range. As such, it becomes less necessary to control the access through password authentication. For example, once a user enters a business, the user device can be connected to its WiFi network without a, password. Outside the business premises, there would be no usable signals.

In some embodiments, a real-time communication system is provided including an access device and at least one communication device. The access device can be used to determine whether the distance between the communication device and the access device reaches a predetermined access distance for accessing the network. If so, the communication device accesses the network via the access device to achieve real-time communication between the communication device and other communication devices in the network.

Further, the access device may comprise a distance control module, a first wireless communication module and a first control module which is used to coordinate and control the work of the distance control module and the first wireless communication module; the communication device comprises a distance response module, a second wireless communication module and a second control module which is used to coordinate and control the work of the distance response module and the second wireless communication module.

The distance control module and the distance response module are connected through a distance characteristic signal, and may be used to control the predetermined access distance between the communication device and the access device when the communication device accesses the network.

The first wireless communication module and the second wireless communication module may be connected via a network signal, and can be used to enable the communication device to access the network via the access device.

When the access device determines that the distance between the communication device and the access device reaches the predetermined access distance for accessing the network, the first wireless communication module and the second wireless communication module establish a connection, which enables the communication device to access the network through the access device to achieve real-time communication between the communications device and other communication devices in the network.

The present disclosure also provides an access device, which comprises a distance control module and a control module, the distance control module is used to send a distance characteristic signal within a predetermined access distance and receive the response message returned by the communication device, the control module is used to determine whether the distance between the communication device and the access device reaches a predetermined access distance; if the distance control module receives the response message, the control module determines the access distance is reached and allows the communication device to access the network and saves the response message into the control module; meanwhile, the control module issues network access parameters to the distance response module via distance control module.

The present disclosure also provides a communication device, which includes a distance response module and a wireless communication module, the distance response module may be used to receive characteristic signal sent by access device within predetermined access distance and to send back response message, and to receive network access parameters issued by access device after the access device determines the response message is legitimate, the wireless communication module is used to access the network according to the network access parameters through the access device.

A network access method is also provided, by which users can conveniently access network and conduct real-time communication within a specific area.

A method through which a communication device accesses the network, or through which an access device allows a communication device to access the network, may include the following steps:

The distance control module sends distance characteristic signal in the form of broadcasting within a predetermined access distance;

The distance response module receives the distance characteristic signal and sends back a first response message to the distance control module;

The distance control module receives the first response message, the access device determines that the distance between the communication device and the access device reaches the predetermined access distance, and saves the first response message into the first control module; meanwhile, the first control module issues network access parameters to the distance response module through the distance control module.

The distance response module sends the network access parameter received to the first wireless communication module through a second control module and a second wireless communication module in turn.

The first wireless communication module establishes a network signal connection between the first wireless communication module and the second wireless communication module according to the network access parameters received.

Further, during the process in which the distance response module receives the distance characteristic signal and returns a first response message to the distance control module, before the response message is returned, the distance response module also determines whether the distance response module receives the distance characteristic signal, if it does, it returns response message; if it does not, it continues to wait.

Further, the distance control module receives the first response message, the access device determines that the distance between the communication device and the access device reaches the predetermined access distance, and saves the first response message into the first control module, meanwhile, during the process of the first control module issues network access parameters to the distance response module through distance control module and before issuing network access parameters, the first control module also determines whether the first response message is legitimate, if yes, it issues network access parameters to distance response module, if no, it returns to execute the step in which distance control module sends distance characteristic signal in the form of broadcasting within the predetermined access distance.

In some embodiments, the method through which the distance control module issues distance characteristic signal is either active querying, or sending after being triggered.

In some embodiments, the methods by which the distance control module sends distance characteristic signal after being triggered may include:

The distance response module sends an access request signal to the distance control module;

After receiving the access request signal, the distance control module sends a distance characteristic signal in the form of broadcasting.

In some embodiments, in the process of conducting real-time communication, the distance control module also detects the distance between the communication device and the access device: the distance control module periodically sends out command message requesting the communication device to return a second response message; the first control module receives the second response message through distance control module and compares it with the first response messages stored in itself, if the messages are consistent, it maintains network connection with the communication device; if not consistent, it disconnects the network connection with the communication device.

In some embodiments, the distance characteristic signal comprises an acoustic signal, an optical signal, or an electromagnetic signal.

The beneficial effects of some of the embodiments as a result of adopting the above approaches may include one or more of: achieving real-time communication between the communication device and other communication devices in the network by using the access device to determine whether the distance between the communication device and the access device reaches a predetermined access distance for accessing the network and allowing the communication device to access the network through the access device when it reaches the predetermined distance. Therefore, when users use the communication device to access the network, as long as it is within the predetermined access distance within which the access device allows network access, the user can access the network automatically without password authentication, thus realizing real-time communication. It therefore greatly simplifies the process in which communication devices accessing the network and brings conveniences to users.

In addition, during the process of real-time communication, by using the distance control module to detect the distance between the communication module and the access module, the network connection can be disconnected automatically when the distance between the communication device and the access devices is beyond the predetermined access distance, therefore reducing unnecessary waste of resources while improving the security.

The following is a description of some of the embodiments in further details in conjunction with the accompanying drawings.

The disclosure relates to a real-time communication system. Communication system of existing technologies often cannot precisely control the range covered by the wireless network, causing the coverage of the wireless network reach outside a desired area. As a result, users outside the desired area can also access the network. In order to avoid the situation where a user outside the specific area (unauthorized users) can access the network, users within a specific area (authorized users) usually need password authentication for accessing the network with a communication device, which makes the process of network access complicated. According to some embodiments disclosed herein, the distance between the communication devices that access the network and the access device are precisely controlled, thereby reducing or eliminating the need for password authentication. Through a substantially precise control of the distance between the communication devices and the access device, the users within a predetermined access distance can access the network automatically without password authentication, thus bringing convenience to the users.

The following embodiments provide a real-time communication system that can precisely control the distance between the communication device accessing the network and the access device. The real-time communication system may include an access device and at least one communication device; in which the access device determines whether the distance between communication device and the access device reaches the predetermined access distance for accessing the network, if it is reached, the communication device is allowed to access the network through the access device, thus realizing real-time communication between the communication device and other communication devices in the network.

If a communication device accesses the wireless network, the access device in the real-time communication system will determine whether the distance between this communication device and the access device reaches the predetermined access distance for accessing the network, and allows communication devices within the predetermined access distance to access the network directly without password authentication. As such, the access process is simplified and it facilitates the use of the system by users.

The access device can determine whether the distance between the communication device and the access device reaches the predetermined access distance for accessing the network. For example, as shown in FIG. 1, the access device comprises a distance control module, a first wireless communication module, and a first control module configured to coordinate and control the work of the distance control module and the first wireless communication module; the communication device comprises a distance response module, a second wireless communication module, and a second control module configured to coordinate and control the distance response module and second wireless communication module; the distance control module and the distance response module can be connected through distance characteristic signals, and can be used to control the predetermined distance between the communication device and the access device when the communication device accesses the network; the first wireless communication module and the second wireless communication module can be connected through a network signal, which may be used to enable the communication device to access the network through the access device.

If the access device determines that the distance between the communication device and the access device reaches the predetermined access distance for accessing network, the access device and the communication device can enable the first wireless communication module and the second wireless communication module to establish connection through network signal according to wireless communication protocol, thus enabling the communication device to access the wireless network through access device and realizing real-time communication between the communication device and other communication devices in the network. On the other hand, if the distance between the communication device and the access devices does not reach the predetermined distance for accessing network, it will not allow the communication device to access the network, at that time the first wireless communication module and the second wireless communication module cannot establish a connection, thus the communication devices cannot realize real-time communication. The reasons the first wireless communication module and the second wireless communication module are not connected include that the second wireless communication module has not obtained authorization from the first wireless communication module.

In some embodiments, the predetermined access distance is the maximum distance between the communication device and the access device when allowing the communication device to access the network. As long as the distance between the communication device and the access device is within the maximum value of the predetermined access distance, the communication device can access the network. Here, the range determined by the predetermined access distance is referred to as the specific area. On the other hand, if the distance between the communication device and the access device has not reached the predetermined access distance, the communication device cannot access the network, even if there is wireless network coverage outside the specific area, the communication device will not be able to access the network because it is beyond the predetermined access distance. This prevents user terminals outside the specific area to access the network. Wherein, there are many types of communication devices that can be used to conduct real-time wireless communications within the specific area, such as mobile phones, laptops, or tablet computers.

In some practical applications, the predetermined access distance may be an artificially determined maximum distance between the communication device and the access device for allowing communication device to access the wireless network. For example, it can be determined according to the actual size of the specific area and actual needs, such as 10 meters, 30 meters, 50 meters, etc. In other words, the predetermined access distance is a precise distance value, and the distance control module/distance response module are used to set and control this precisely predetermined access distance, thus determining precisely whether the communication device is within the specific area within which network access is allowed.

In some embodiments, the access device uses the following methods to allow the communication devices to access the network. For example, specific steps may include:

The distance control module inside the access device issues distance characteristic signal in the form of broadcasting within predetermined access distance; the distance characteristic information carried by the distance characteristic signal controls the maximum distance between the communication device and the access device when allowing the communication device to access the network, e.g., the predetermined access distance mentioned above. On the other hand, the distance response module inside the communication module receives distance characteristic signal and returns a first response message.

The distance control module can detect whether it has received the first response message from the distance response module; if yes, the access device determines that the distance between the communication device and the access device has reached the predetermined access distance; it allows the communication device to access the network and stores the first response message in the first control module, and issues network access parameters to the distance response module through the distance control module. For example, at this time, the second wireless communication module obtains the permission for network access from the first wireless communication module. The distance response module receives the network access parameters, and hands it over to the second wireless communication module through second control module; the second wireless communication module sends network access parameters to the first wireless communication module; the first wireless communication module receives the network access parameters, and establishes the network signal connection between the first wireless communication module and the second wireless communication module using these network access parameters and wireless communication protocols. Thus, this communication device can access the wireless network through the access device, thus realizing real-time communication.

In some embodiments, before the distance response module returns the first response message, it also determines whether it has received the distance characteristic signal; if the distance response module receives the distance characteristic signal, it returns the first response message to the distance control module, if the distance response module does not receive the distance characteristic signal, it will continue to wait to receive the distance characteristic signal, and no response message is returned to the distance control module. The first response message may comprise communication device identification information, such as ID number, etc.

In some embodiments, before the first control module issues network access parameters, the first control module determines whether the first response message is legitimate; if it is legitimate, it issues network access parameters to the distance response module inside the communication device. If the first control module determines that the first response message received is not legitimate, the first control module will not issue network access parameters to the communication device. Then, since communication device has not received the returned network access parameters, it cannot establish network connection with the access device, thus the communication device cannot access the network.

In some embodiments, the distance control module can determine whether the first response message is legitimate according to the following methods:

The distance control module can generate a random number A. When transmitting the distance characteristic signal, it also places the random number A in the distance characteristic signal and sends it out. Using the random number A, through a specific algorithm, a new number $B1$ can be generated in the distance control module. The distance control module can enter the state of waiting to receive a first response message. After the distance response module receives the random number A carried by the distance characteristic signal, by using the same algorithm which the distance control module uses, a new number $B2$ can be generated, and placed in the first response message and sent to the distance control module. The distance control module compares $B2$ in the first response message and $B1$ it generated itself, and determines whether they are equal. If $B1$ and $B2$ are equal, it determines the first response message to be legitimate. If $B2$ and $B1$ are not equal, it determines this message to be not legitimate. It should be noted that the above-described method can be used to determine whether the first response message is legitimate. However, methods to determine whether the first response message is legitimate are not limited to the method described above.

In some practical applications, the distance characteristic signal issued by the distance control module can also be of many types, such as acoustic signals, optical signals, or electromagnetic signals. When the distance between the communication device and the access devices is outside the range allowed by the predetermined access distance, the communication device cannot receive the distance characteristic signal. Similarly, the network signal connecting the first wireless communication module and the second communication module can also have a variety of types, such as 2.40 GHz WIFI network, or electromagnetic signals of other frequencies.

The distance control module can issue distance characteristic signals in the form of broadcasting within the predetermined access distance. In some practical applications, there are may ways through which the distance control module sends distance characteristic signals. For example, active querying can be used. In some embodiments, the distance control module sends distance characteristic signals continuously. In some embodiments, the distance control module can use the method of sending distance characteristic signals after receiving the trigger signals from the communication device and tests whether itself receives response messages. In some embodiments, the specific method that the distance control module sending distance characteristic signals after being triggered includes: the distance response module sends an access request signal to the distance control module; the distance control module sends distance characteristic signal in the form of broadcasting after receiving the access request signal.

To make it more convenient to use, in some embodiments, the distance control module can also test the distance between the communication device and access device. For example: the distance control module inside the access device periodically issues command messages requesting all communication devices in the network to send back a second response message. This second response message is the identification information of the communication device itself, for example, an ID number. The distance control module receives the second response message and sends it to the first control module. The first control module compares the second response message with the first response message sent by the communication device that is previously saved in the first control module itself and determines if they are consistent. If yes, it keeps the network connection with the communication device. If not, then it disconnects the network connection with the communication device. In the real-time communication process, detecting the distance between the communication device and the access device may guarantee that the communication device can be automatically disconnected when the user is not inside the specific area. This not only brings convenience to the users, but also reduces unnecessary waste of network resources.

In a first embodiment described below, WiFi network signal is used as the network signal between the first communication module and the second communication module. This is used as an example to describe the real-time communication process of this real-time communication system in details, and it should be understood that real-time communication systems according to the embodiments disclosed herein are not limited to WiFi.

Figure 2:
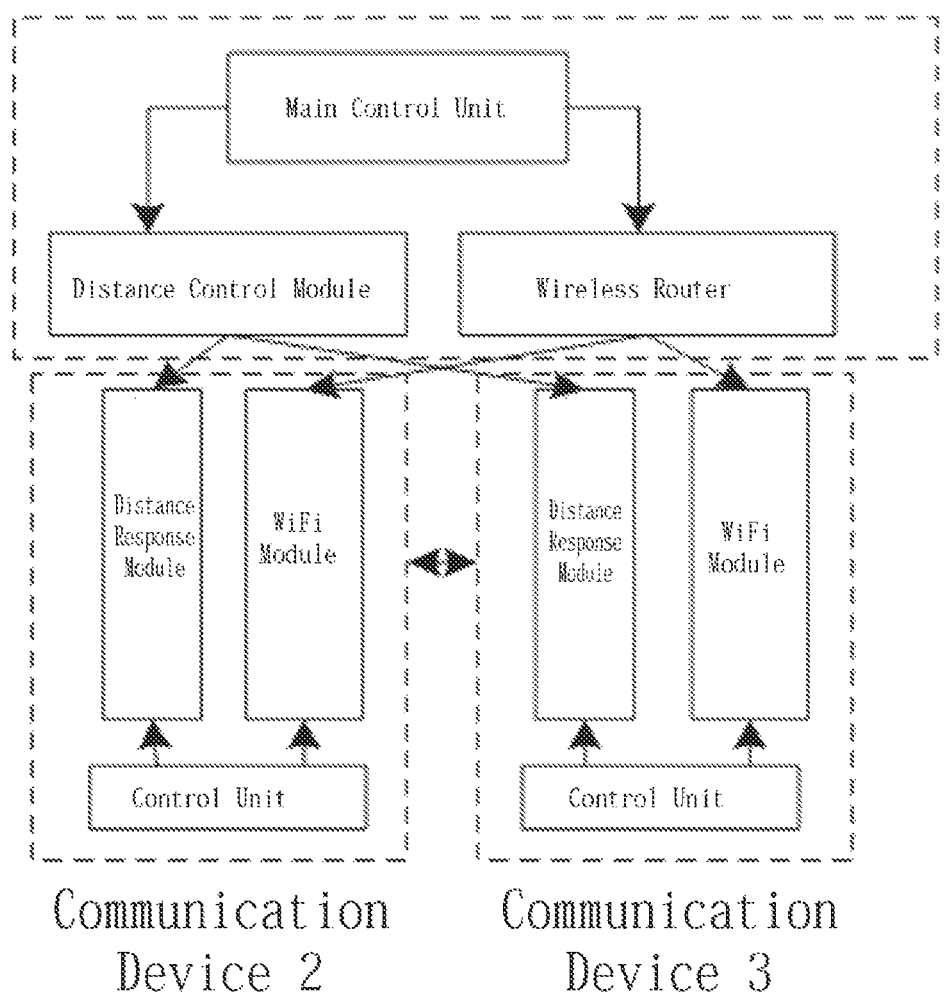
FIG. 2 is a block diagram a communication system according to some other embodiments.

In this example where the network signal is WiFi network signal, the second wireless communication module inside the communication device may be referred to as the WiFi Module. Within the access device, a wireless router is used to realize the functions of the first wireless communication module. Thus, as shown in FIG. 2, the access device includes a distance control module, a wireless router, a first control module; the communication device includes a distance response module, a WiFi module, and a second control module. Wherein, the first control module within the access device is used to control and coordinate the sending and receiving of signals of the distance control module and the wireless router, the wireless router is connected with Ethernet through a network cable; the second control module within the communication device is used to control and coordinate the sending and receiving of the signals of distance response module and WiFi module. The distance control module and the distance response module are connected by distance characteristic signals and are used to control the predetermined distance between the communication device and the access device when the communication device accesses the network. The WiFi Module and the wireless router are connected by a 2.4 GHz WiFi network signal, and they are responsible for the network access of communication devices and conduct real-time communication.

First, the distance control module sends distance characteristic signals. The predetermined access distance of signal sending is controlled within a certain range, for instance, 10 meters, 30 meters, or 50 meters, etc.

Next, it is determined whether the distance response module receives the distance characteristic signal. If it is received, then the distance response module sends a first response message to distance control module.

Next, the distance control module will receive the first response message sent back by the distance response module and send it to first control module, the first control module will determine whether the first response message is legitimate, if yes, issues network access parameters through distance control module to distance response module.

Next, the distance response module receives the downlink-issued network access parameters and sends it to the WiFi module through the second control module, the WiFi module receives the network access parameters and sends it to the wireless router.

The wireless router receives the network parameters and establishes network signal connection between the first wireless communication module and the second wireless communication module according to wireless communication protocols.

As such, the communications devices realizes the network access between the wireless router and the WiFi module through the access protocols of WiFI network signals, which enable the communication device to successfully access the network, thus realizing real-time communication with other communication devices in the network.

It should be noted that there are many types of real-time communication, such as IM, QQ, MSN, FeiQ voice intercom, data exchange, etc., which can implement the embodiments disclosed herein.

There can be one communication device within the specific area, and there can be more than one. As shown in FIG. 2, there are two communication devices within a specific area. Device 2 and device 3 can be connected to the wireless network within the specific area in the manner described above.

As such, not only a real-time communication between device 2 and device 3 can be realized, a real-time communication between device 2/device 3 and other communication devices within networks outside the specific area can also be realized.

Meanwhile, the embodiments disclosed herein also provide a real-time communication method, which enables communication devices to access a network within a specific area. The method may include the following steps:

The access device determines whether the distance between the communication device and the access device reaches the predetermined access distance; if yes, then it allows the communication device to access the network through the access device, thus realizing real-time communication between the communication device and other communication devices within the network.

Figure 3:
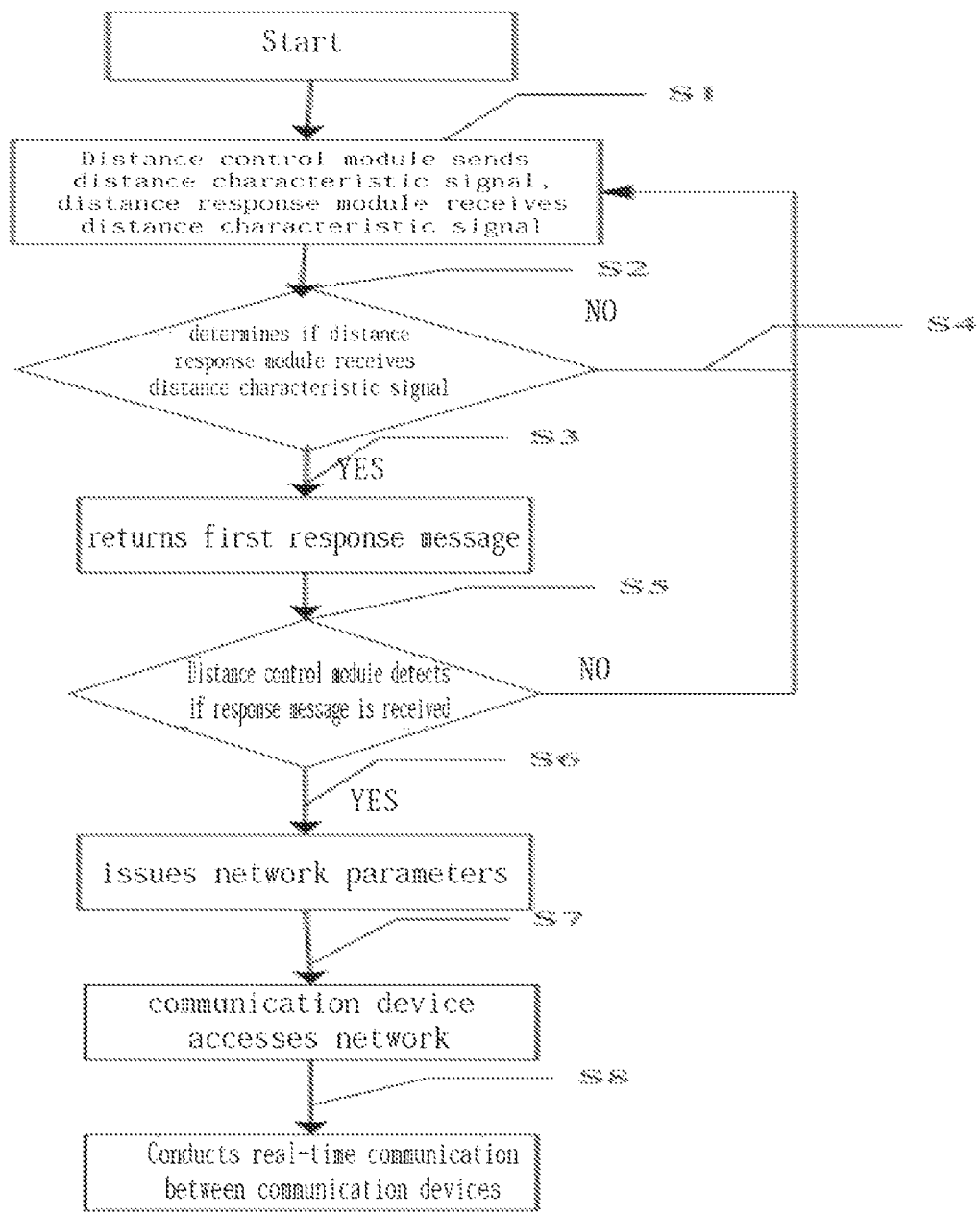
FIG. 3 is a flowchart of a method for a communication device to access the network according to some embodiments.

In a second embodiment, as shown in FIG. 3, a real-time communication method is described in detail wherein the distance between the communication device and the access device can be precisely controlled.

This real-time communication method may include the following steps:

The distance control module issues distance characteristic signals in the form of broadcasting. The distance response module receives the distance characteristic signals;

Determining whether the distance response module receives distance characteristics signal; if yes, the distance response module returns a first response message to distance control module; if no, the distance response module continues to wait for distance characteristic signals;

The distance control module detects whether the first response message from the distance response module is received; if yes, it issues network access parameters to the communication device through the distance control module; if not, then switches to the distance control module sending distance characteristic signals in the form of broadcasting; the distance response module receives the distance characteristic signals.

The communication device accesses the network according to the network access parameters received;

Real-time communications between communication devices can be conducted.

To enhance security, before the distance control module detects whether having received the first response message from the distance response module and issues the network access parameters to the communication device through the distance control module, an additional step can be added;

The first control module also determines whether the first response message received by the distance control module is legitimate; if yes, issues network access parameters to the communication device through the distance control module; otherwise switches to the distance control module sending distance characteristic signal in the form of broadcasting, and the distance response module receives distance characteristic signal.

Figure 4:
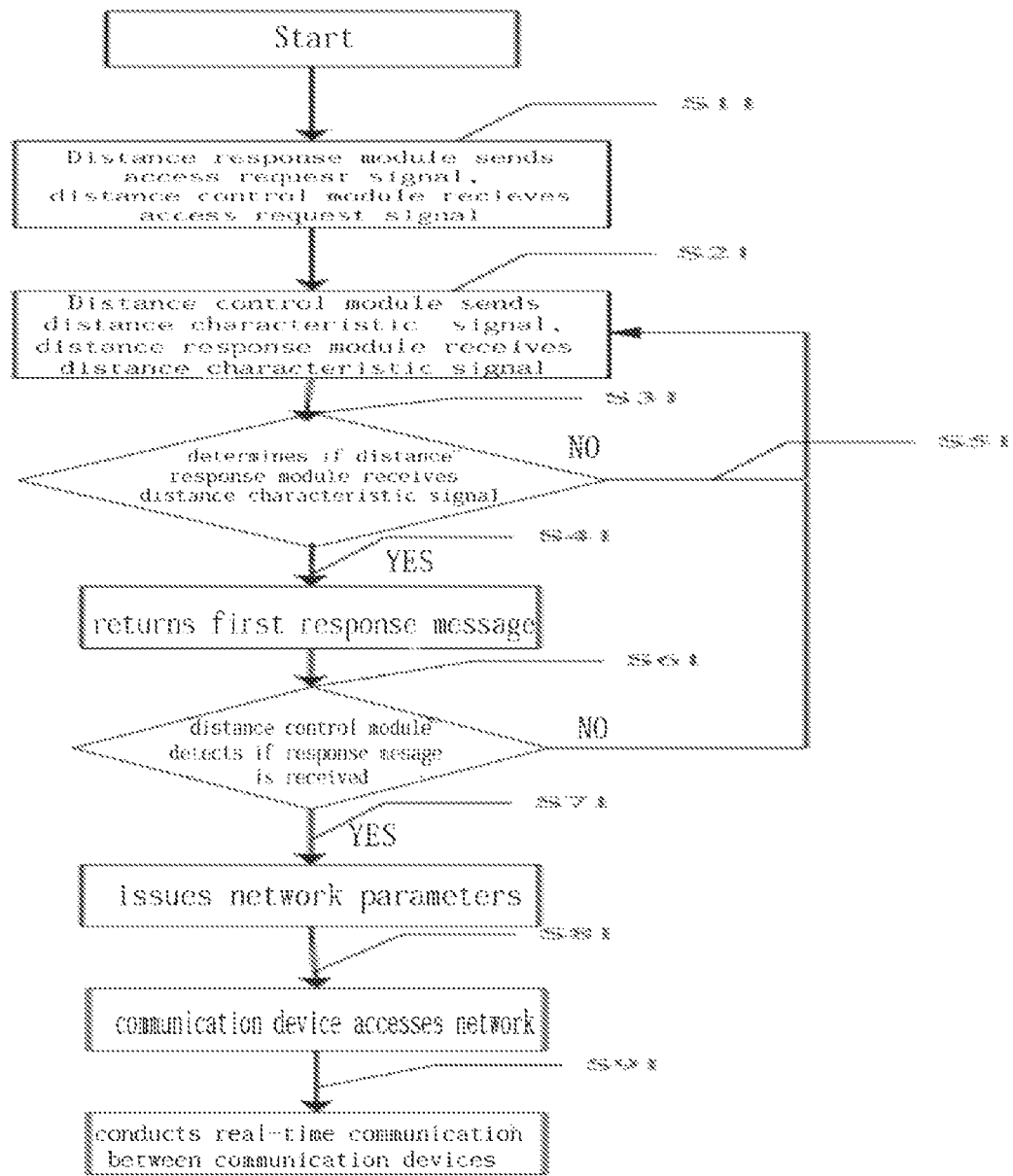
FIG. 4 is a flowchart of a method for the communication device to access the network according to some other embodiments.

The embodiment described in details above embodiment can be the case where the distance control module sends distance characteristic signals through active querying. In some other embodiments, another method can also be used: the distance response module sends an access request message first; the distance control module receives this access request signal (trigger signal), then sends distance characteristic signals, as shown in FIG. 4. Other steps of this method may include:

The distance response module sends an access request signal; the distance control module receives this access request signal;

The distance control module sends distance characteristic signals in the form of broadcasting;

Determining whether the distance response module receives these distance characteristic signals; if yes, then the distance response module sends back the first response message to the distance control module; if no, the distance response module continues to wait for receiving these distance characteristic signals;

The distance control module checks whether the first response message is received; if yes, it issues network access parameters to communication device through the distance control module; if no, then the distance control module sends distance characteristic signals in the form of broadcasting, and the distance response module receives the distance characteristic signals;

Issuing in a downlink the network access parameters to the communication device through distance control module;

The communication device accesses the network according to the network access parameters received;

Conducting real-time communications between communication devices.

Figure 5:
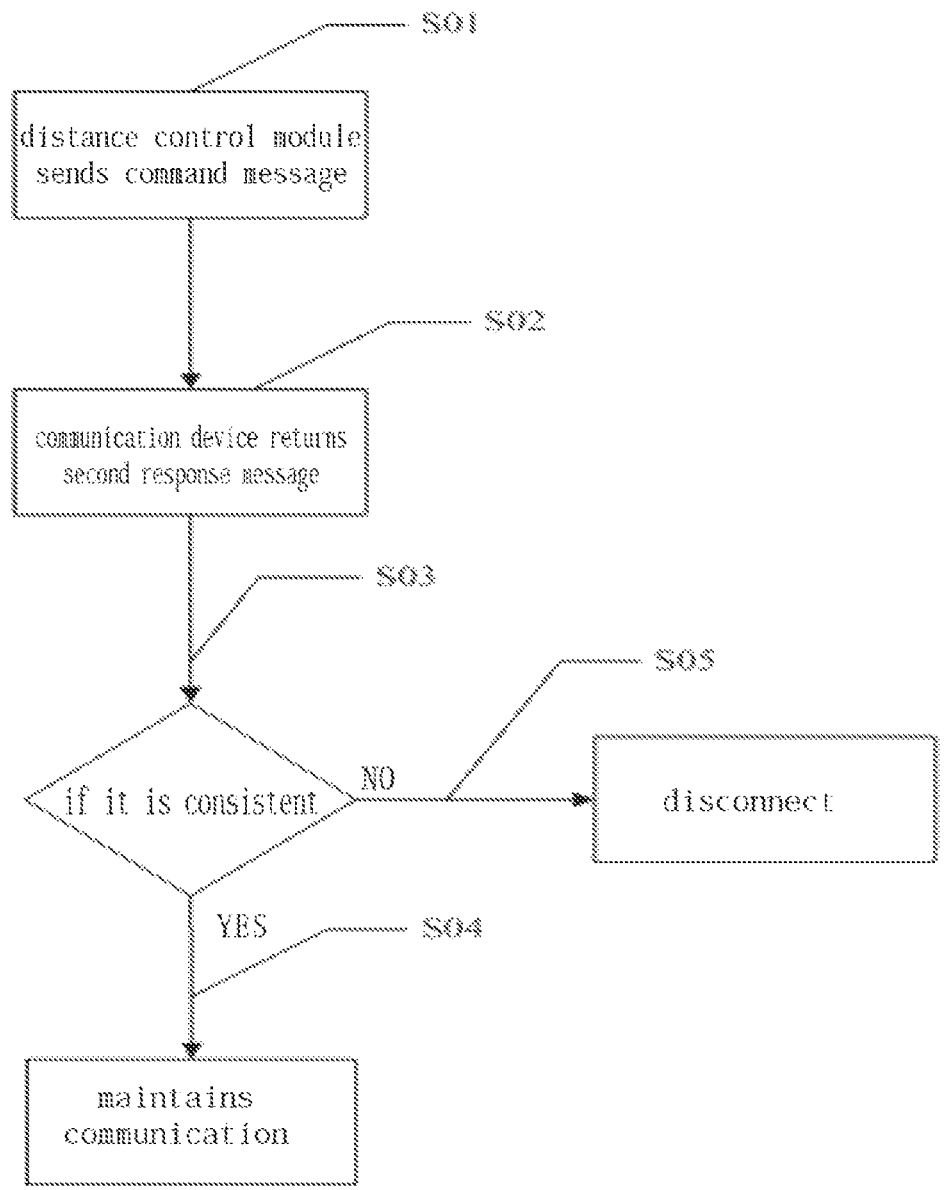
FIG. 5 is a flowchart of a process in which a distance control module carries out distance detection according to some embodiments.

To bring further convenience to the users, as shown in FIG. 5, in the process of conducting the real-time communication, the distance control module also detects the distance between the access device and the communication device, using the following example steps:

The distance control module sends a command message;

The distance response module inside the communication device sends back a second response message;

The second control module determines whether the second response message received by the distance control module is consistent with the first response message of this communication device that is stored in the second control module; if it is consistent, then maintains network access with the communication device;

If it is not consistent, then disconnect network connection with the communication device.

The present disclosure also provides an access device. The access device may include a distance control module and a control module. The distance control module can send distance characteristic signals and receive response messages returned by communication devices within the predetermined access distance. The control module can determine whether the distance between the communication device and the access device reaches the predetermined access distance; if the distance control module receives a response message, then the control module determines that the predetermined access distance is reached, thereby allowing the communication device to access the network, and saving the response message into the control module; meanwhile, the control module issues access parameters to the distance response module through the distance control module.

The access device can determine whether the distance between the communication device accessing network and itself reaches a predetermined distance, which extends the functionalities of existing access devices.

The present disclosure also provides a communication device, which comprises a distance response module and a wireless communication module. The distance response module can receive a distance characteristic signal sent by the access device, send back a response message within a predetermined access distance, and receive network access parameters after the access device determines the response message is legitimate. The wireless communication module can access the network through the access device according to the network access parameters.

The communication device can receive network access parameters within a predetermined access distance, and extends the functionalities of existing communication devices.

The distance between the communication devices accessing network and the access device can be precisely controlled with the application of the disclosed embodiments. Thus, as long as the users are within the coverage area of the wireless network with a predetermined access distance within which network access is allowed, users' communication devices can access the network automatically without password authentication, thereby greatly facilitating the process by which users access the wireless network and bringing convenience to users. On the other hand, for users beyond the predetermined distance, even if there is wireless network coverage, they cannot access the network, thereby preventing unauthorized users from accessing the network. Some of the embodiments disclosed herein are especially suitable for companies, cafes, bars and other places.

All references cited in the description are hereby incorporated by reference in their entirety. While the disclosure has been described with respect to a limited number of embodiments, those skilled in the art, having benefit of this disclosure, will appreciate that other embodiments can be advised and achieved which do not depart from the scope of the description as disclosed herein.

The invention claimed is:

1. A real-time communication system comprising:
an access device; wherein the access device is configured to:
 determine whether a distance between a communication device and the access device reaches a predetermined access distance for accessing a network;
 if so, allow the communication device to gain access to the network via the access device to achieve real-time communication between the communication device and the network.

2. The system of claim 1, wherein the access device comprises:
a distance control module;
a first wireless communication module; and a first control module configured to coordinate and control the distance control module and the first wireless communication module;
wherein the communication device comprises:
 a distance response module;
 a second wireless communication module; and a second control module configured to coordinate and control the distance response module and the second wireless communication module;
 wherein the distance control module and the distance response module are coupled through a distance characteristic signal configured to control the predetermined access distance between the communication device and the access device when the communication device access the network;
 wherein the first wireless communication module and the second wireless communication module are connected via a network signal configured to enable the communications device to access the network via said access device; wherein if the access device determines that the distance between the communication device and the access device reaches the predetermined access distance for accessing the network, the first wireless communication module and the second wireless communication module establish a connection, which enables the communications device to access the network through the access device, thereby realizing real-time communication between the communication device and other communication devices in the network.

3. The system of claim 2, wherein the distance characteristic signal comprises at least one of an acoustic signal, an optical signal, or an electromagnetic signal.

4. The system of claim 1, wherein the access device comprises:
a distance control module; and
a control module;
wherein the distance control module is configured to:
send a distance characteristic signal within the predetermined access distance; and
receive a response message sent back by the communication device;
wherein the control module is configured to:
determine whether the distance between the communication device and said access device reaches the predetermined access distance;
determine that the predetermined access distance is reached if the distance control module receives the response message, and allow the communication device to access the network and save the response message in the control module;
issue network access parameters to the distance response module through the distance control module.

5. The system of claim 4, wherein the distance characteristic signal comprises at least one of an acoustic signal, an optical signal, or an electromagnetic signal.

6. The system of claim 1, further comprising at least one communication device, wherein the communication device comprises:
a distance response module; and
a wireless communication module;
wherein the distance response module is configured to:
receive a characteristic signal issued by the access device within the predetermined access distance;
return a response message; and
receive network access parameter issued by the access device after the access device determines that the response message is legitimate; and
wherein the wireless communication module is configured to access the network according to the network parameters through the access device.

7. The system of claim 6, wherein the distance characteristic signal comprises at least one of an acoustic signal, an optical signal, or an electromagnetic signal.

8. The system of claim 1, wherein the access device is configured to allow the communication device to gain access to the network based on substantially precise range control without password authentication.

9. A communication method between a real-time communication system and a plurality of communication devices, wherein the real-time communication system comprises an access device, the method comprising:
determining whether a distance between a communication device and the access device reaches a predetermined access distance for accessing a network;
if so, allowing the communication device to gain access to the network via the access device to achieve real-time communication between the communication device and the network.

10. The method of claim 9, wherein the access device comprises:
a distance control module;
a first wireless communication module; and
a first control module;
wherein the communication device comprises:
a distance response module;
a second wireless communication module; and
a second control module;
wherein the method further comprises:
issuing, from the distance control module, characteristics signals in the form of broadcasting within the predetermined access distance;
receiving, at the distance response module, the distance characteristic signals; and
sending, from the distance response module, a first response message to the distance control module;
receiving, at the distance control module, the first response message;
determining, at the access device, that the distance between the communication device and the access device has reached the predetermined access distance;
saving the first response message in the first control module;
issuing, from the first control module, network access parameters to the distance response module through the distance control module;
sending, from the response module, the network access parameters to the first wireless communication module through the second control module and the second wireless communication module in turn;
establishing, at the first wireless communication module, network signal connection between the first wireless communication module and the second wireless communication module according to the network access parameters received.

11. The method of claim 10, further comprising:
during the process in which the distance response module receives the distance characteristic signal and returns the first response message to said distance control module, before the response message is returned,
determining whether the distance response module receives the distance characteristic signal;
if yes, returning the response message;
if no, continuing to wait.

12. The method of claim 10, further comprising:
prior to issuing the network access parameters, determining, at the first control module, whether the first response message is legitimate;
if yes, issuing the network access parameters to the distance response module;
if no, going back to the step in which the distance control module issues the distance characteristic signals in the form of broadcasting within the predetermined access distance.

13. The method of claim 10, wherein said issuing characteristics signals comprises at least one of:
active querying; or
sending the characteristics signals after the distance control module being triggered.

14. The method of claim 13, wherein said issuing characteristics signals comprises:
sending, from the distance response module, the distance characteristic signals after the distance response module sending an access request signal to the distance control module thereby triggering the distance control module.

15. The method of claim 14, further comprising:
after the distance control module receiving the access request signal, sending the distance characteristic signals in the form of broadcasting.

16. The method of claim 10, further comprising:
during the process of conducting real-time communication, detecting, at the distance control module, the distance between the communication device and the access device;
issuing, from the distance control module, command message periodically to request the communication device to return a second response message; receiving, at the first control module, the second response message through the distance control module;
comparing the second response message with the first response message stored in the first control module;

if the first and second response messages are consistent, then maintaining network connection with the communication device; and if the first and second response messages are not consistent, then disconnecting the communication device from the network.

17. The method of claim 10, wherein the distance characteristic signals comprise at least one of an acoustic signal, an optical signal, or an electromagnetic signal.

18. The method of claim 9, wherein said determining comprises precisely determining the distance such that the communication device is allowed to access the network based on the precisely determined distance without the need for password authentication.

19. The method of claim 18, further comprising:
automatically connecting the communication device to the network without password authentication once the communication device is within the predetermined distance based on the precisely determined distance.

20. The method of claim 19, further comprising:
automatically disconnecting the communication device from the network once the communication device is beyond the predetermined distance based on the precisely determined distance.

\* \* \* \* \*